(12) United States Patent
Wolzenski et al.

(10) Patent No.: US 7,454,379 B1
(45) Date of Patent: Nov. 18, 2008

(54) PROCESS FOR COMPREHENSIVE FINANCIAL AND ESTATE PLANNING

(75) Inventors: Bernard H. Wolzenski, St. Louis, MO (US); Jack J. Desemar, Jr., Baton Rouge, LA (US)

(73) Assignee: Future System Advisors, LLC, Baton Rouge, LA (US)

( * ) Notice: Subject to any disclaimer, the term of this patent is extended or adjusted under 35 U.S.C. 154(b) by 389 days.

(21) Appl. No.: 09/717,189

(22) Filed: Nov. 21, 2000

Related U.S. Application Data

(60) Provisional application No. 60/167,083, filed on Nov. 23, 1999.

(51) Int. Cl.
*G06Q 40/00* (2006.01)
(52) U.S. Cl. .............................. 705/37; 705/38; 705/36; 705/35
(58) Field of Classification Search .................. 705/4, 705/35, 36, 37, 38, 34; 235/184
See application file for complete search history.

(56) References Cited

U.S. PATENT DOCUMENTS

| | | | | |
|---|---|---|---|---|
| 5,214,579 | A * | 5/1993 | Wolfberg et al. | 705/36 R |
| 5,655,085 | A * | 8/1997 | Ryan et al. | 705/4 |
| 5,802,500 | A * | 9/1998 | Ryan et al. | 705/36 |
| 5,999,917 | A * | 12/1999 | Facciani et al. | 705/36 R |
| 6,161,096 | A * | 12/2000 | Bell | 705/36 R |
| 6,249,770 | B1 * | 6/2001 | Erwin et al. | 705/10 |
| 6,430,542 | B1 * | 8/2002 | Moran | 705/36 |
| 6,513,019 | B2 * | 1/2003 | Lewis | 705/35 |
| 6,611,807 | B1 * | 8/2003 | Bernheim et al. | 705/4 |

OTHER PUBLICATIONS

Reverse split $ fits key person ins. Sowerwine, Robert W. National Underwriter. (Life, health/financial services ed.). Erlanger: Jul. 4, 1994. vol. 98, Iss. 27; p. 23, 3 pgs.*
"AS Trophy Policy," more formally named: American Skandia Life Assurance Corp. Appendix E—Prior Policy for the American Skandia Trophy modified single premium variable life policy Oct. 1, 2001 (prior art, pp. 7).
"1997 Skandia Policy," more formally named: Skandia Life Assurance SEC filing dated Oct. 17, 1997 showing a Modified Single Premium Variable Life Insurance Policy (pp. 85).

(Continued)

*Primary Examiner*—Frantzy Poinvil
*Assistant Examiner*—Clement Graham
(74) *Attorney, Agent, or Firm*—Robert C. Kain, Jr.; Kain & Associates

(57) ABSTRACT

A process for generating a financial and liquidity estate plan for a client and defining a life insurance product for use therewith. The process includes determining the client's assets and defining a plurality of asset categories based on type and purpose of asset. The process also includes categorizing the client's assets in the defined categories. By performing liquidity analyses of the categorized assets, the process determines current estate liquidity and projected future estate liquidity of the client. The process further includes generating a plan for re-allocating the client's assets among the defined categories based on the liquidity analyses. The product defined by the process is a pre-paid, variable life insurance product having a death benefit that varies daily as a function of gains and losses on the invested cash 10 value of the product.

51 Claims, 5 Drawing Sheets

OTHER PUBLICATIONS

"1998 Skandia Amendment Policy," more formally named: American Skandia Life Assurance SEC filing Pre-Effective Amendment No. 2 filed Apr. 29, 1998 (pp. 62).
Non-Prior Art "AS SPVLI Policy," more formally named: Supplemental explanatory material: American Skandia Life Assurance Corp. SPVLI modified single premium variable life policy May 1, 2002 (not prior art, pp. 50).

* cited by examiner

FIG. 3A

| CATEGORY I |
|---|
| PERSONAL AND PLEASURE |

| ASSET TYPES: | ASSET PURPOSE: |
|---|---|
| -HOMES | -SHELTER AND ENJOYMENT |
| -BOATS | -LIFESTYLE ENHANCING |
| -AUTOS | -NON-INCOME PRODUCING |
| -TOYS | -NON-LIQUID |
| -JEWELRY | -NON-CONSUMABLE |

FIG. 3B

| CATEGORY II |
|---|
| RESERVE CAPITAL |

| ASSET TYPES: | ASSET PURPOSE: |
|---|---|
| CASH AND EQUIVALENTS: | -EMERGENCIES |
| -CHECKING | -OPPORTUNITIES |
| -SAVINGS | -LARGE CAPITAL EXPENDITURES |
| -MONEY MARKET | -OPERATING CAPITAL |
| -CD'S | -CURRENT ESTATE TAX LIQUIDITY |
| -T-BILLS | (IF DEATH OCCURS TODAY) |
| -EARNED INCOME | |
| -PASSIVE INVESTMENT ORDINARY INCOME | |

FIG. 3C

| CATEGORY III | |
|---|---|
| RETIREMENT FUNDING | |
| ASSET TYPES: | ASSET PURPOSE: |
| -INDIVIDUAL STOCKS HELD LONG TERM<br>-MUNICIPAL BONDS/FUNDS<br>-CLOSELY HELD COMPANY EQUITY<br>-INVESTMENT REAL ESTATE | -WEALTH ACCUMULATION (GROWTH ORIENTED)<br>-SOURCE OF INCOME FOR LIVING EXPENSES AFTER RETIREMENT<br>-CURRENT ESTATE TAX LIQUIDITY IF DEATH OCCURS TODAY |

FIG. 3D

| CATEGORY IV | |
|---|---|
| RETIREMENT PROTECTION AND ESTATE LIQUIDITY | |
| ASSET TYPES: | ASSET PURPOSE: |
| -FUTURE SYSTEM PRODUCTS<br>-ANNUITIES<br>-QUALIFIED PLANS<br>-IRA'S<br>-SEP'S<br>-LIFE INSURANCE | -EXEMPT ASSETS FROM CREDITORS TO PROVIDE INCOME ONLY IN CASE ALL OTHER ASSETS ARE LOST<br>-CURRENT ESTATE TAX LIQUIDITY IF DEATH OCCURS TODAY<br>-PROJECTED ESTATE TAX LIQUIDITY |

US 7,454,379 B1

PROCESS FOR COMPREHENSIVE FINANCIAL AND ESTATE PLANNING

CROSS-REFERENCE TO RELATED APPLICATION

This application claims the benefit of commonly assigned provisional patent application Ser. No. 60/167,083, filed Nov. 23, 1999, the entire disclosure of which is incorporated herein by reference.

BACKGROUND OF THE INVENTION

This invention relates generally to financial and estate planning and, particularly, to a computerized process for comprehensive, integrated liquidity management for use in generating a financial and estate plan, and custom designing a life insurance product for a client.

Present processes fail to provide a unified, systematic process for all aspects of liquidity planning. As a result, consumers often have separate and sequential plans for retirement and estate planning. Existing insurance products, whether fixed or variable, provide for an amount of coverage purchased through a series of payments. Except in the case of simple guaranteed cost contracts (e.g., whole life or term policies), the total amount of payments depends on non-guaranteed elements such as interest crediting rates, investment fund performance and mortality charges. As a result, a client early in life is often locked into purchasing a significantly greater amount of death benefit than is currently needed in anticipation of matching some arbitrary projection of what his or her wealth will be in the future. If the projection is too high, the client ends up in an "over-funding" situation; if the projection is too low and the term portion inadequate, the client ends up with an "exploding" policy.

In general, a policy is said to "explode" when a client's out-of-pocket premium suddenly increases from the original illustrated premium level to a much higher one. For example, the original illustrated premium and cash value may not meet the requirements for keeping the policy in force due to the lowering of interest crediting rates and raising of mortality costs. Unfortunately, the new premium needed to keep the policy in force at older ages will often be unaffordable. This typically results in the forfeiture of the policy and the loss of all premiums ever paid, all cash value and all death benefits. Existing insurance products offer very little design and policy management flexibility options to solve these problems. Moreover, the role of the insurance agent has traditionally been to assist with product selection rather than product design.

Insurance industry experts recognize that universal life and variable universal life products are also at risk for explosion and over-funding similar to traditional life products and life products with term riders.

For these reasons, a planning process is needed for reducing the risk of over-funding and exploding insurance products. Moreover, such an actuarial product design is desired to provide a consumer with the ability to make a series of discrete purchases, each of which is completed by a single payment, instead of providing an amount of coverage purchased through a series of payments. This will permit maximizing the amount of death benefit at older ages, maximizing the cash value per premium dollar, minimizing at all times the cost of "at-risk mortality" and tracking current and future liquidity needs.

SUMMARY OF THE INVENTION

The invention meets the above needs and overcomes the deficiencies of the prior art by providing a process for comprehensive, integrated liquidity management for reducing the risk of over-funding and exploding insurance products. Among the several objects of the invention may be noted the provision of such process that permits making a series of discrete insurance product purchases; the provision of such process that maximizes the amount of death benefit at older ages; the provision of such process that maximizes the cash value per premium dollar; the provision of such process that minimizes at all times the cost of "at-risk mortality"; the provision of such process that tracks current and future liquidity needs; and the provision of such process that can be carried out efficiently and economically.

Briefly described, a process embodying aspects of the invention generates a financial and liquidity estate plan for a client. The process includes determining assets of the client and defining a plurality of asset categories based on type and purpose of asset. The process also includes the step of categorizing the client's assets in the defined categories. By performing liquidity analyses of the categorized assets, the process determines current estate liquidity and projected future estate liquidity of the client. The process further includes generating a plan for re-allocating the client's assets among the defined categories based on the liquidity analyses.

Another embodiment of the invention is directed to a process for defining a pre-paid, variable life insurance product. The process includes the steps of defining a funding premium, determining a cash value of the life insurance product based on the funding premium and then defining a pre-paid death benefit purchased with the funding premium based on the cash value of the life insurance product. According to the computer implemented process, the cash value of the insurance product is invested in one or more investment accounts or different funds and the cash value of the life insurance product is then adjusted as a function of gains and losses on the investment accounts or funds. The process further includes the step of defining the pre-paid death benefit purchased with the funding premium based on the adjusted cash value of the product.

Alternatively, the invention may comprise various other methods and systems.

Other objects and features will be in part apparent and in part pointed out hereinafter.

BRIEF DESCRIPTION OF THE DRAWINGS

FIGS. 3A-3D are block diagrams illustrating an asset classification structure for use with the process of FIG. 2.

Corresponding reference characters indicate corresponding parts throughout the drawings.

DETAILED DESCRIPTION OF PREFERRED EMBODIMENTS

Figure 1:
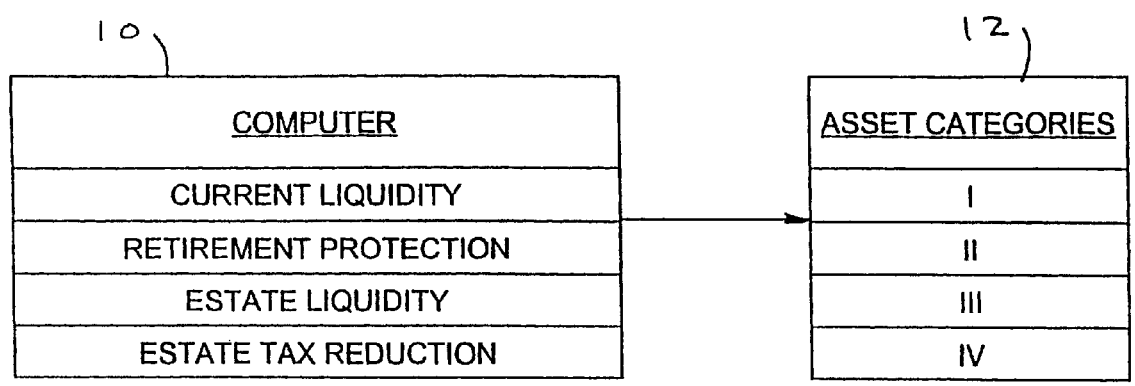
FIG. 1 is a block diagram of a computer system for executing a process as part of a program of financial and estate planning in accordance with a preferred embodiment of the invention.

Referring now to FIG. 1, one preferred embodiment of the invention uses a computer 10 to execute a process, including a number of modules, as part of a program of integrated financial and estate planning. The present invention is preferably a single point source providing comprehensive, integrated liquidity management for determining the insurance needs of a client and designing an insurance product to meet those needs. The life insurance product has a series of prepaid death benefit amounts in a single contract purchased with a series of one-time funding premiums instead of a single death benefit purchased with a series of ongoing premiums. The right to make future purchases, as scheduled in the policy, is established at the time the life insurance policy is issued. According to the invention, a planner executes the computerized process, also referred to herein as the "Future System Planning Process," to determine the parameters of these insurance products.

The Future System Planning Process has a number of modules to ensure a thorough and efficient solution to the client's financial planning needs. The modules preferably include a retirement protection analysis, a current estate liquidity analysis, an estate tax reduction analysis and a future estate liquidity analysis. The process also includes initially categorizing the client's assets in four asset categories, indicated at reference character 12, and identifying the client's long term financial goals. In particular, the computer 10 calculates a comprehensive solution that identifies which of the client's assets and how much of them to transfer to particular life insurance products, referred to herein as "Future System Products." The analyses also provide for an appropriate allocation and consumption of existing assets. Advantageously, the Future System Planning Process implemented by computer 10 provides more complete and efficient liquidity solutions for the client that are more likely to be implemented.

The planner combines the four categories of assets with the four steps, or modules, in the planning process implemented by computer 10. The modules permit those skilled in estate planning to complete their work on behalf of the client. The process provides complementary data and, when combined with the Future System Products, provides solutions to the client's needs otherwise unavailable. According to the invention, this combination of Future System Planning Process and Future System Products reduces the likelihood of either overfunding or explosion. The client applies for a premium schedule, as opposed to a face amount of insurance and, thus, obtains significantly greater flexibility without committing to making future payments to continue the life insurance. Indeed, each payment stands on its own as a pre-paid life insurance purchase because the policy insurance amount is automatically adjusted daily by the computer process using net single premium ratios of cash value to death benefit. This ensures that no further payments will be required. The cost of the at-risk insurance amount is calculated and subtracted from the cash value. Beneficially, the new actuarial design of the Future System insurance product better solves the client's needs.

According to the invention, the process and product together help clients meet their estate liquidity, estate tax reduction, retirement funding and retirement protection needs. The Future System Planning Process provides comprehensive, integrated liquidity management coordinating the estate plan's liquidity needs with the design and procurement of the funding product, protecting wealth for retirement during life and providing liquidity for the estate after death. The Future System Planning Process addresses multiple issues involved in estate liquidity planning with one coordinated liquidity solution. As such, the process replaces and/or coordinates the separate efforts of many different individuals specializing in asset disposition at death, wills, trusts, cash flow planning, investment planning, retirement, life insurance, qualified plans and individual retirement accounts (IRS's), incomes tax, estate tax and business continuation plans.

The combination of product and process yields a more efficient, effective and accurate solution to client planning needs. For the advisor or agent, the process is faster, more comprehensive and structured to encourage long-term relationships. For the carrier, the combination ensures that the insurance company product remains innovative and relevant in the rapidly changing financial services marketplace. In addition, the combination of product and process makes annual financial planning reviews much more relevant and beneficial to clients. The compensation structure in the product contemplates such review. Moreover, by setting this up as a trailing fee, the advisor can earn compensation over the long run by attending to client needs over the life of the account.

Figure 2:
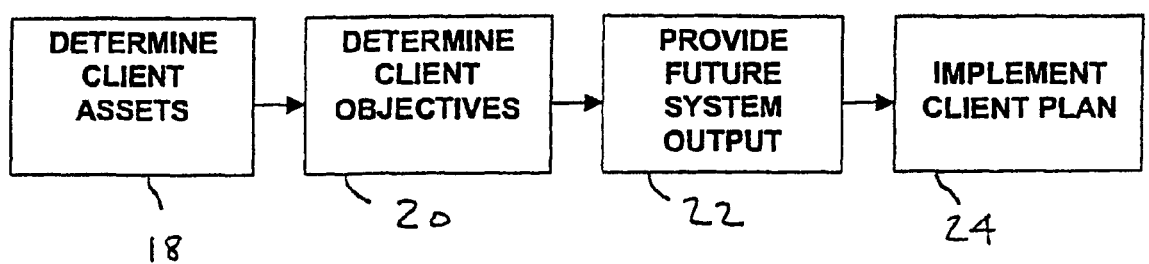
FIG. 2 is a flow diagram illustrating the process of generating a financial and estate plan.

Referring now to FIG. 2, a flow diagram, generally indicated at 14, illustrates the basic format of the Future System Planning Process. Presentations, forms and questions take clients through the entire planning process to meet their financial goals. This forms the basis of the input to the process. Beginning at step 18, the process first determines and classifies the client's assets. In general, the Future System process uses a three-step approach to classify a client's assets. The approach first structures the client's net worth into four categories. Each category is then assigned asset types. Finally, each asset type is assigned a specific purpose. FIGS. 3A-3D illustrate an asset classification structure according to the invention. In this embodiment, assets are classified in four main categories. In FIG. 3A, Category I classifies personal and pleasure assets, which include assets such as homes, boats, automobiles, toys and jewelry. These assets provide shelter and enjoyment and enhance the owner's lifestyle but do not need to be income producing, liquid or consumable. Thus, Category I assets are not considered a source for estate tax liquidity, retirement funding or retirement protection.

FIG. 3B illustrates Category II, which is for reserve capital assets. These assets include cash and cash equivalents such as checking, savings or money market accounts, certificates of deposit, treasury bills, earned income and passive investment ordinary income (e.g., distributions, dividends). In contrast to Category I assets, the assets in Category II provide current estate tax liquidity if death occurs today. These assets are often used for emergencies, opportunities, large capital expenditures and operating capital.

The classification structure of the Future System process distinguishes between retirement funding and retirement protection. Retirement funding is the timeline of asset consumption after retirement. Retirement protection essentially protects the client's minimum desired income level in the event of loss due to unforeseen risks. The traditional retirement planning approach often ignores retirement protection, focusing only on retirement funding. However, retirees in general fail to stay current in their fields, leave their practices and companies and sell their businesses. In short, they lose their current income earning ability. This leads to two conclusions, namely, assets that are the only source of lifetime income should be protected, and all assets needed to protect retirement should be "exempt" property.

FIG. 3C illustrates Category III, which includes unprotected retirement funding assets such as individual stocks that are held long term, municipal bonds/funds, equity in closely held companies, investment real estate and other relatively tax efficient, unprotected assets. These unprotected assets are not exempt from the reach of creditors in bankruptcy. In other words, the Category III assets should either be taxed at a capital gains rate (e.g., 20% or less), non-taxable or tax deferred. Since Category III assets are growth oriented, they provide for accumulation of wealth, a source of income for living expenses after retirement and current estate tax liquidity if death occurs today.

In FIG. 3D, Category IV includes retirement protection and estate liquidity assets. According to the invention, Category IV includes assets which are in tax deferred vehicles such as Future System Products, annuities, qualified plans, IRA's, simplified employee pensions (SEP's) and life insurance. Depending on state and federal laws, these assets are generally exempt from creditors in bankruptcy and, thus, provide income in case all other assets are lost. Because the vehicles are tax deferred, Category IV assets may use relatively tax inefficient funding products such as stock mutual funds, corporate bonds/funds and individual stocks that are held short term. Tax inefficient pertains to immediate taxation of gains and distributions at ordinary income rates. In addition to providing income when other assets are lost, these exempt assets provide current estate tax liquidity if death occurs today and projected estate tax liquidity.

The Future System Planning Process assists clients in achieving retirement protection by restructuring existing assets with an objective of not impairing current or future lifestyles. This approach encourages the consumption of unprotected assets first, qualified plans, IRA's and annuity assets second, and Future System Products last. Funding priorities are placed on Category IV assets. The process also considers taxes and their effect on the growth of the estate assets. The objective is to maintain tax efficient products that can be held until gains are taxed at long term capital gain rates in Category III, and tax inefficient products in tax deferred vehicles in Category IV. This approach maximizes the compound effect on tax deferral on all asset types and minimizes the tax rate if tax is ever paid.

Referring again to FIG. 2, the process continues at step 20 for determining the client's financial planning objectives. According to the invention, once the client's assets are identified, the client's liquidity objectives are then determined. This is accomplished at the start of each of the four integrated process modules described above: retirement protection analysis; current estate liquidity analysis; estate tax reduction analysis; and projected estate liquidity analysis. The objectives to be determined include: 1) retirement protection goals, 2) estate liquidity goals, 3) estate tax reduction goals, and 4) future estate liquidity goals. The Future System Planning Process determines client objectives by walking the client through a series of questions in the modules.

The purpose of the retirement protection module is to protect a client's minimum desired retirement income in the event of a loss of income due to unforeseen risks. This module distinguishes between assets that are protected and unprotected from bankruptcy. The current estate tax liquidity module takes a comprehensive look at assets by category with an emphasis on degree of liquidity. The current liquidity module also defines estate disposition goals, determines if the net amount for the client's heirs is congruent with client's goals and identifies the need for term insurance, if appropriate. The estate tax reduction module helps clients to manage estate taxes in a manner consistent with their preferences for charitable gifting and to identify which assets to gift and when to gift them, given emotional, personal, financial and tax ramifications. Also, the estate tax reduction module completely separates the two concepts of "gifting" from "providing estate tax liquidity." The projected future estate tax liability of the client may be much greater than the current tax liability as the estate continues to escalate in value even after retirement. The purpose of the projected estate liquidity module is to define the client's estate protection and liquidity goals for the future, to systematically allocate specific assets to be used later for future estate liquidity, to align investment performance with estate liquidity needs by design and to separate estate planning from estate liquidity funding.

Appendix A provides an exemplary planning scenario based on execution of the four modules.

At step 22 of FIG. 2, the process provides a calculation of a comprehensive solution based on the initial asset categorization and identified goals. The solution preferably identifies which of the client's assets and how much of each asset to transfer to Future System Products, including additional term riders, as well as the appropriate allocation and consumption of existing assets. The solution identifies the potential optional premium schedule to ensure retirement protection and estate liquidity. In addition, the solution identifies and insures liquidity risks with term insurance until self-insurance is possible. The customized financial plan also allocates the sub-accounts to mirror the allocation of assets that make up the remaining non-Future System Product estate assets, mirroring potential risk and future growth as closely as possible.

Preferably, computer 10 generates a report using, for example, Microsoft PowerPoint®, Excel® and Word® software applications to meet each individual client's needs for designing a customized plan. This includes all the requisite calculators. The main output of these tools is a liquidity analysis form generated through Microsoft Visual Basic® and Excel® software applications. At the final step of FIG. 2, step 24, the process implements the client plan (and reviews it on an on-going basis).

With respect to implementing a solution meeting the client's needs, the present invention provides the ability to purchase a Future System Life Insurance Product with a series of pre-paid death benefit amounts in a single contract with a series of one-time funding premiums instead of paying a series of ongoing premiums on a single death benefit amount. Preferably, the right to make future purchases, as scheduled in the policy, is established at the time the policy is issued. Insurability does not need to be re-established in order to make the successive purchases over time. Each funding premium payment for the life insurance product acquires an amount of life insurance that varies with investment results over time, but which life insurance is fully purchased once the funding premium is paid. Under this unique approach, each net funding premium payment buys pre-paid variable life insurance for which no further funding premium payments are required. There is always enough money to pay all future mortality charges for the life insurance, regardless of investment performance. Any increase or decrease in death benefit is caused by performance of the investment accounts of the life insurance policy or additional one-time funding premium payments. The right to make future purchases, as schedule in the policy, is established at the time the policy is issued. When these funding premium payments are made, they will create additional cash values and, therefore, a higher potential death benefit.

Figure 4:
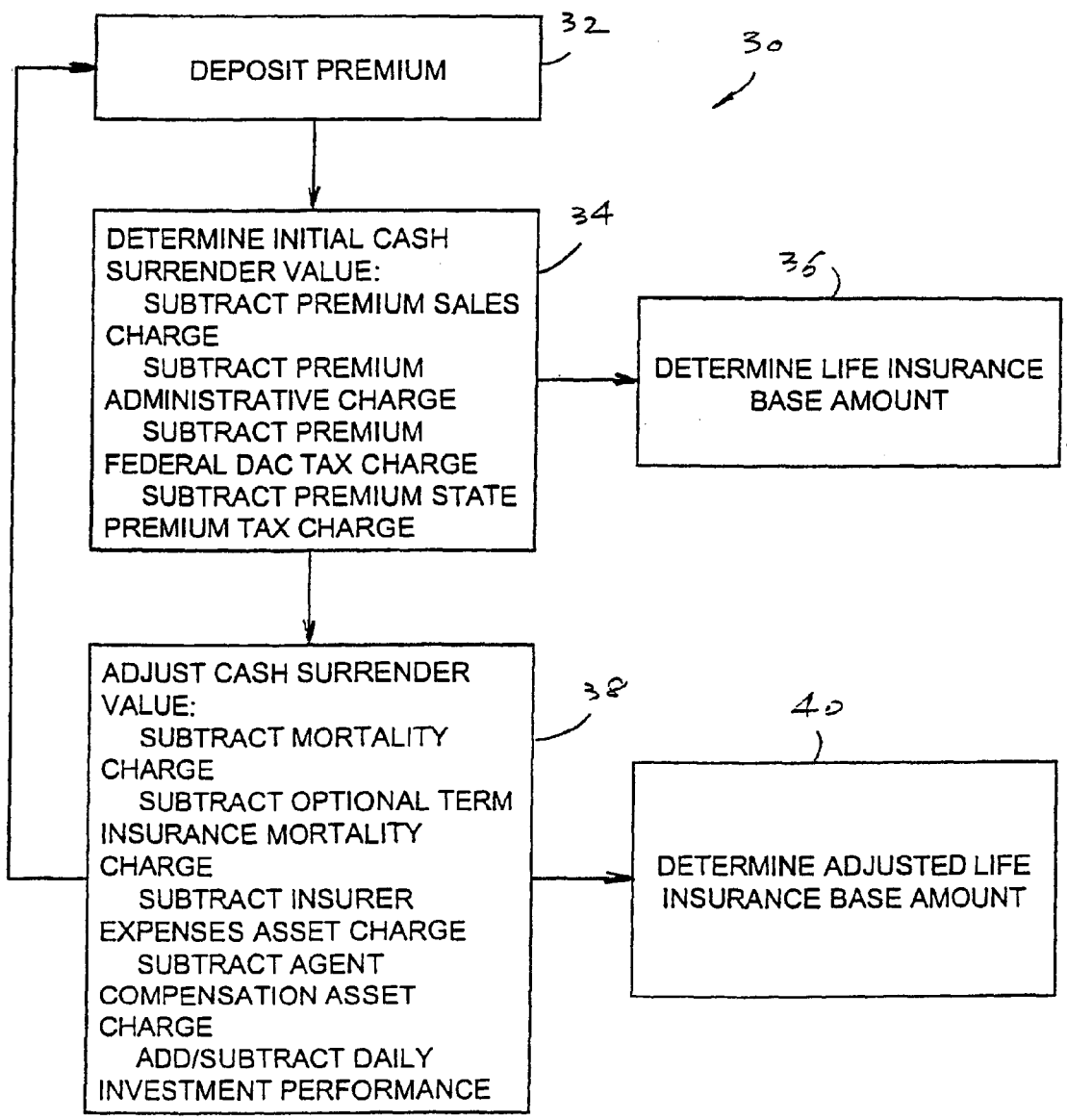
FIG. 4 is a flow diagram illustrating a process for defining a life insurance product for use with the process of FIG. 2.

Referring now to FIG. 4, a flow diagram 30 illustrates operation of the invention to define a Future System Life Insurance Product according to the present invention. In general, Future System products are "pre-paid" insurance products. This type of product is similar to a "paid up" product, which is a fixed policy that does not have any future premiums. It differs from a "paid up" product in that the death benefit amount of the Future System Insurance Product is not fixed and varies proportionately to investment results. Beginning at step 32, the client deposits a funding premium into the contract. Since Future System Products are pre-paid, the funding premium can be deposited in any year. Proceeding to step 34, the initial cash surrender value in the policy is determined by subtracting certain values from the premium. For example, the cash surrender value is determined by subtracting a premium sales charge (0% in this instance), a premium federal tax charge (e.g., 1.3%) and a premium state tax charge (e.g., 2.25%). In a preferred embodiment, a one-time premium administrative charge (e.g., $800) is subtracted from the funding premium at the beginning of the first month of the life insurance policy for lifetime service and administration of the policy. This calculation yields the initial cash surrender value of the life insurance policy created by the funding premium payment. In a preferred embodiment of the invention, the cash value amount is allocated among one or more investment sub-accounts. For example, the client may be able to select from a number of different investment funds. The investment account values for the different funds or investment accounts fluctuate daily with investment performance (see step 38). Moreover, cash value can be reallocated among the investment sub-accounts at any time. At step 36, the life insurance base amount (or death benefit) is determined as a function of the cash surrender value. The life insurance base amount or death benefit will vary as a function of the age of the insured and his/her risk classification and smoking status. This base amount death benefit represents the minimum pre-paid variable insurance (pre-paid by the funding premium) that must be purchased on any given day by law to retain life insurance status (net single premium method) of the life insurance product based on age declining ratio to cash value amount on any given day. The purchase of Future System Life Insurance Products provides for all future mortality costs on a guaranteed basis; the mortality costs are deducted from cash value as earned.

According to the invention, the Future System Product re-calculates the value of the account every day. Proceeding to step 38, the cash surrender value is adjusted for charges and the gain or loss on investment or account performance. The flow diagram returns to steps 32 and 34 to account for new funding premiums (net funding premium charges). The charges subtracted from the cash surrender value include a mortality charge and an optional term insurance mortality charge. The mortality charge represents a pro-rated portion of a monthly charge for the "at risk amount" (i.e., the difference between the life insurance amount and the cash value). The optional term insurance mortality charge varies based on the age of the insured and his/her risk classification and smoking status. This optional charge is for a level term that does not vary with investment performance and that can be purchased in addition to the mandatory life base. Since it is optional, the term can be removed or reduced at any time. Other charges subtracted from the cash surrender value include an insurer expenses asset charge and an agent compensation asset charge. As an example, the maximum insurer expenses asset charge is 0.75% annual rate. The maximum agent compensation asset charge is 1.5%, for example, for liquidity planning using the Future System Planning Process, custom private policy design, continued service and tracking of the liquidity plan to policy performance and design. The asset charges can be reduced by a breakpoint schedule. An advantage of the Future System Product is the ability to spread these costs over the life of the account. An integral feature of the Future System Life Insurance Product is to adjust the cash surrender value for daily investment account performance. In this instance, the cash value increases or decreases with the gain or loss to separate investment account values.

At step 40, the life insurance base amount death benefit is determined as a function of the adjusted 25 cash surrender value. As described above, this amount represents the minimum pre-paid variable insurance that must be purchased on any given day by law to retain life insurance status (net single premium method) of the life insurance product based on age declining ratio to cash value amount on any given day. In other words, the life insurance base amount varies daily relative to cash value still based on the age declining ratio.

The Future System Product is unlike term insurance where premiums are typically guaranteed but then the coverage expires or must be converted to permanent insurance at a much higher cost. Moreover, the Future System Product is unlike universal life insurance where mortality costs are usually guaranteed but unscheduled future premiums may be required.

A life insurance company product without an up-front "at risk" death benefit and high front-end loads is typically referred to as an "annuity." However, annuities are subject to income taxation on the entire gain at death under the current tax laws. The Future System Product lowers each product cost and charge as much as possible. This maximizes the life insurance policy's immediate and ultimate cash values and the ultimate death benefit while at the same time retaining the tax status of life insurance under current law (see Section 7702 of the tax code). According to the invention, the Future System Life Insurance Product provides these advantageous results by 1) removing as many up-front loads as possible and reducing ongoing charges for expenses, mortality and profit, while providing several growth options, to maximize the cash value per premium dollar of the policy; and 2) cash value purchasing the minimum amount of life insurance necessary under Section 7702 using the net single premium approach to minimize at all times the cost of "at risk mortality."

To improve the flexibility of the product, the client has the option of adding an up-front term death benefit rider to the product to the least level needed and retaining it for the least time necessary to insure "current risk" not self-insurable through existing liquidity. The Future System Planning Process applies risk management principles to achieve custom private policy design at or in between these two extremes of maximum term or no term.

Policy management flexibility and options allow the three product components, namely, premium, cash value and death benefit, to each be altered without affecting the other two, working "independently" instead of "interdependently". With this product, the term rider can be reduced or eliminated anytime without decreasing premium, surrendering cash value or incurring surrender charges. The premium can be reduced or stopped any year without surrendering cash value or any death benefit. The cash value can be surrendered without reducing premium or term rider.

In a preferred embodiment of the invention, the results of the Future System Planning Process liquidity analysis determines an annual premium schedule for the Future System Insurance Product for which the client will apply. Underwriting by the insurance company is based on a projected amount at risk assuming the annual premium schedule applied for in the life insurance product is paid and a reasonable gross annual interest rate is earned by the client. The process of applying and being underwritten for the annual premium schedule in the life insurance product gives the client the right to make future purchases within the annual premium schedule of the policy. Purchases within a policy year may be made at any time within the limitation of the annual premium schedule in the policy. Moreover, funding premiums may be discontinued at nay time without canceling the existing coverage.

Each funding premium paid purchases a death benefit on the date it is paid based on its net contribution into the cash value of the life insurance policy, assumptions of guaranteed mortality costs and the general account guaranteed interest rate. The death benefit beyond that date fluctuates as cash value fluctuates. At the time of the life insurance policy issue, the insurance company can charge, for example, a one-time administrative charge. The only charges after issue are a percentage of funding premium, mortality charges and a percentage of cash value. These features, in combination with the determination of death benefit being recalculated daily based on net single premiums, ensure that there will be enough money to pay future mortality charges without paying additional funding premiums.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

APPENDIX A

Example of Modules

The retirement protection module determines a minimum amount of after-tax income that will be needed to fund retirement if all other assets and retirement funding vehicles are lost. The after-tax income is in the form of a fund of exempt assets since the module addresses retirement protection rather than funding.

Using Joe and Jane Client as an example, the retirement protection module uses the input data shown in Table A-1:

TABLE A-1

| RETIREMENT PROTECTION INPUT VALUE | |
|---|---|
| Present Age | 60 |
| Expected retirement protection age | 65 |
| Maximum age of mortality | 95 |
| Protected annual after-tax retirement income | $200K |

The protected annual after-tax retirement income is measured in present day dollars and depends greatly on the retirement lifestyle desired by the client. Assuming an inflation rate of 3%, the retirement protection module calculates that an annual after-tax income of approximately $232 K will be needed by the planned retirement age of 65. Based on these figures, the retirement protection module calculates that approximately $2.75 M with zero remaining is needed in after tax principal if the after-tax interest to age 95 is 6% (or using an immediate annuity rate at that age for lifetime income). Similarly, based on the inflated after-tax annual income, the retirement protection module calculates that approximately $3.19 M with zero remaining is needed in after-tax principal if the after-tax interest to age 95 is 6% (or using an immediate annuity rate at that age for lifetime income). These figures yield an after-tax principal of approximately $4.90 M being needed if payout is indexed at 3% for inflation.

If the client currently has $1.13 M in protected liquid assets, this amount provides immediate protection in case of a total loss today. Assuming an after-tax growth rate of 6%, the future value of this amount is approximately $2.02 M leaving a deficiency of $1.17 M. The retirement protection module then determines that the annual funding into Future System Products for the five years before retirement is about $190 K to be divided half on the life of the husband and half on the life of the wife. For simplicity, this figure is shown as $200 K in Table A-6, below. In other words, the retirement protection module calculates the amount of non-exempt assets to be converted to exempt assets based on inter-related factors such as the rate of consumption of assets, time line, client preferences and so forth.

The following Table A-2 is an example of a comprehensive look at Joe and Jane Client's estate tax liquidity.

TABLE A-2

| Joe and Jane Client's Present Assets | Net Equity (before tax) | Net Equity (after Tax) | Death Liquidity | Retirement Income (after tax) |
|---|---|---|---|---|
| CATEGORY I | | | | |
| Home Equity | 400,000 | 400,000 | 0 | |
| Personal & Autos | 100,000 | 100,000 | 0 | |
| Vacation Home | 100,000 | 100,000 | 0 | |
| CATEGORY I Sub-Total | 600,000 | 600,000 | 0 | |
| CATEGORY II | | | | |
| Cash | 600,000 | 600,000 | 600,000 | |
| Accrued Income Tax Liability | 0 | 0 | 0 | |
| Expected Inheritance | 0 | 0 | 0 | |
| CATEGORY II Sub-Total | 600,000 | 600,000 | 600,000 | |
| CATEGORY III | | | | |

TABLE A-2-continued

| Joe and Jane Client's Present Assets | Net Equity (before tax) | Net Equity (after Tax) | Death Liquidity | Retirement Income (after tax) |
|---|---|---|---|---|
| Family Business | 2,000,000 | 1,700,000 | 0 | 300,000 |
| Listed Securities | 1,200,000 | 950,000 | 1,100,000 | 0 |
| CATEGORY III Sub-Total | 3,200,000 | 2,650,000 | 1,100,000 | 300,000 |
| CATEGORY IV | | | | |
| Future System Products | | | | |
| Deferred Annuities | 200,000 | 180,000 | 180,000 | |
| SEP | 400,000 | 250,000 | 225,000 | |
| CATEGORY IV Sub-Total | 600,000 | 430,000 | 405,000 | |
| INSIDE Total | 5,000,000 | 4,250,000 | 2,105,000 | |
| OUTSIDE ESTATE ASSETS | | | | |
| L.I. C.V./Paid Up Insurance | 250,000 | 250,000 | 500,000 | |
| OUTSIDE Total | 250,000 | 250,000 | 500,000 | |

The current estate liquidity module uses a precise method to determine the estate liquidity goals of the client and incorporates all available estate tax liquidity, minimizing traditional life insurance. Once the estate disposition goals are defined, the following values, shown in Table A-3, are calculated:

TABLE A-3

| CURRENT ESTATE LIQUIDITY | VALUE |
|---|---|
| Net Worth of Joe and Jane Client | $5.0M |
| Current liquidity need assuming both spouses died today | $1.9M |
| Net to heirs from the estate | $3.1M |
| Total current liquidity available | $2.6M |
| Current liquidity inside the estate | $2.1M |
| Current liquidity outside the estate | $0.5M |
| Shrinkage due to forced sale of assets | $0.0M |
| Heirs' trust (prior gifted) assets outside the estate (including paid up amount on existing policies | $0.5M |
| Total after tax to heirs | $3.6M |
| Amount to each heir | $1.8M |

Based on the above analysis, each of the two heirs of Joe and Jane Client will receive $1.8 million. In this particular example, $1.8 million to each heir is congruent with their goals, and the amount of up-front death benefit needed outside of the estate for deficiency due to desire or liquidity is $0.

The example of Joe and Jane Client also identifies the information determined through the estate tax reduction/lifetime gifting/chariatable planning process of the estate tax reduction module. This module determines the following information shown below in Table A-4:

TABLE A-4

| PLANNING INFORMATION | GOAL |
|---|---|
| Desire to make lifetime gifts? | Desire gifting as long as it does not affect their liquidity, retirement income or surplus cash from earned income. |
| Desire for long-term gifting program? | Not their preference. |
| Who should receive what gifts? | Primarily children with some financial and some non-financial gifts. |
| Charitable intentions? | None. |
| Level of gifting? | Annual exclusion and maybe some unified |

TABLE A-4-continued

| PLANNING INFORMATION | GOAL |
|---|---|
| | credit later, but not today. |
| What assets will be gifted and when (based on availability, desire, financial, and tax ramifications)? | Begin gifting a discounted interest in the business to Joe Jr. and some cash to John to equalize the gifts. |
| How much of these assets is cash? | $20,000 since they have been gifting that much anyway, but only if there is no commitment. |
| How much of cash is to be gifted outright for present day enjoyment? | $10,000 cash. |
| How much cash is to be used for the specific purpose of purchasing Future System Products to fund tax liquidity needs at death? | $10,000 Future System Products. |
| How much of cash contributions from heirs to purchase Future System Products on the lives of the parents? | $25,000 annually (this figure is the result of the heirs deciding to purchase Future System Products on their parents). |

The projected estate liquidity module for Joe and Jane Client projects the following values shown in Table A-5:

TABLE A-5

| PROJECTED ESTATE LIQUIDITY | VALUE |
|---|---|
| Maximum projected tax (based on 7% CAGR over 35 years which is the remaining time to expected mortality rate) | $17M |
| Total projected death benefits (based on 8% CAGR over 35 years; assets include retirement protection with Future System Product policies and conversion of annuities, life insurance, IRA's, and qualified plans to Future System Product policies) | $13M |
| Shortfall in projected liquidity | $ 4M |

Since there is a $4 million shortfall in projected liquidity, Joe and Jane Client may elect to gift more, increase the liquidity from their retirement policy by either increasing the annual transfer or the projected number of years to make transfers and/or add an optional Future System Product premium to the retirement protection and estate liquidity category (i.e., $100 K per year for six years).

In summary, the action plan for Joe and Jane Client defined by the Future System Planning Process modules includes building Category IV assets first (e.g., Future System Products, SEP's, deferred annuities), re-classifying specific assets such as IRA's and qualified plans, eliminating annuities (consider paying tax now to avoid future taxes) and performing a Section 1035 exchange on current insurance. The following Table A-6 illustrates the action plan, with values in thousands ('000's).

TABLE A-6

| | INSIDE THE ESTATE | | | | OUTSIDE THE ESTATE | | | | |
|---|---|---|---|---|---|---|---|---|---|
| Year | Retirement Protect | Life Ins Sec 1035 | Annuity Conv (Proj. Liq) | QP/IRA Conv (Proj Liq) | Proj Estate Tax | Life Ins. Sec 1035 | Gifted Cash | Heirs Contrib | Total |
| 1 | 200 | 0 | 180 | 250 | | 250 | 10 | 25 | 915 |
| 2 | 200 | . | . | . | | . | 10 | 25 | 235 |
| 3 | 200 | . | . | . | | . | 10 | 25 | 235 |
| 4 | 200 | . | . | . | | . | 10 | 25 | 235 |
| 5 | 200 | . | . | . | | . | 10 | 25 | 135 |
| 6 | . | . | . | . | 100 | . | 10 | 25 | 135 |
| 7 | . | . | . | . | 100 | . | 10 | 25 | 135 |
| 8 | . | . | . | . | 100 | . | 10 | 25 | 135 |
| 9 | . | . | . | . | 100 | . | 10 | 25 | 135 |
| 10 | . | . | . | . | 100 | . | 10 | 25 | 135 |
| 11 | . | . | . | . | 100 | . | 10 | 25 | 135 |
| 12 | . | . | . | . | 100 | . | 10 | 25 | 135 |
| 13-35 | . | . | . | . | . | . | 10 | 25 | 35 |

The claims appended hereto are meant to cover modifications and changes within the scope and spirit of the present invention.

What is claimed is:

1. A computerized method of establishing and maintaining a financial product as a life insurance product for an insured party comprising:
   electronically processing an initial funding premium for said life insurance financial product;
   subtracting funding charges from said initial funding premium and determining an initial cash surrender value for said life insurance financial product thereafter;
   allocating said initial funding premium to one or more sub-accounts of different financial investment funds or accounts;
   on a daily basis, electronically determining account values for said different funds and accounts and calculating a corresponding cash surrender value for said life insurance financial product;
   electronically determining a life insurance base death benefit amount for said insured as a function of said corresponding cash surrender value sufficient to retain life insurance status under a net single premium method based on age declining ratio to cash value amount for said life insurance financial product and age of the insured and his/her risk classification and smoking status, said life insurance base death benefit amount increasing and decreasing based upon said corresponding cash surrender value;
   electronically deducting a cost of an at-risk insurance amount corresponding to said death benefit amount from said corresponding cash surrender value sufficient to retain life insurance status for said life insurance financial product minimizing said cost of said at-risk insurance amount in order to maximize said cash surrender value for said life insurance financial product;
   electronically funding said life insurance financial product with additional funding premiums and setting forth, in a schedule, said additional funding premiums, said schedule set forth in a policy established at the time said life insurance financial product is issued; and
   electronically processing said additional funding premiums set forth in said schedule without establishing insurability upon acceptance of said additional funding premiums such that each funding for said life insurance product acquires an amount of life insurance that varies with investment results over time.

2. A computerized method for a life insurance product as claimed in claim 1 wherein the computerized method defines the funding of said life insurance financial product therein, effects the subtraction of said funding charges and effects the deducting of said cost of said at-risk insurance amount.

3. A computerized method for a life insurance product as claimed in claim 2 wherein determining said life insurance base death benefit amount sufficient to retain said life insurance status is correlated with retaining the tax status of life insurance under current law.

4. A computerized method for a life insurance product as claimed in claim 3 wherein said different financial investment funds or accounts provide earnings and including deducting, from said earnings, the cost of said at-risk insurance amount.

5. A computerized method for a life insurance product as claimed in claim 4 wherein subtracting said funding charges involves subtracting funding charges from the group of funding charges including a premium sales charge, a premium federal tax charge, a premium state tax charge, and premium administrative charge.

6. A computerized method for a life insurance product as claimed in claim 5 wherein said funding charges are subtracted prior to determining account values and calculating said corresponding cash surrender value.

7. A computerized method for a life insurance product as claimed in claim 6 including minimizing said cost of said at-risk insurance amount in order to maximize said cash surrender value for said life insurance financial product.

8. A computerized method for a life insurance product as claimed in claim 7 including re-allocating said corresponding cash surrender value into other financial investment funds or accounts and thereafter determining account values and the corresponding cash surrender value.

9. A computerized method for a life insurance product as claimed in claim 1 wherein determining said life insurance base death benefit amount sufficient to retain said life insurance status is correlated with retaining the tax status of life insurance under current law.

10. A computerized method for a life insurance product as claimed in claim 1 wherein said cost of at risk insurance amount is a pro-rated portion of a monthly charge for the at risk amount and said cost of at risk insurance amount is deducted monthly.

11. A computerized method for a life insurance product as claimed in claim 1 wherein said different financial investment funds or accounts provide earnings and including deducting, from said earnings, the cost of said at-risk insurance amount.

12. A computerized method for a life insurance product as claimed in claim 1 wherein subtracting said funding charges involves subtracting funding charges from the group of funding charges including a premium sales charge, a premium federal tax charge, a premium state tax charge, and premium administrative charge.

13. A computerized method for a life insurance product as claimed in claim 12 wherein said funding charges are subtracted prior to determining account values and calculating said corresponding cash surrender value.

14. A computerized method for a life insurance product as claimed in claim 1 including re-allocating said corresponding cash surrender value into other financial investment funds or accounts and thereafter determining account values and the corresponding cash surrender value.

15. A computerized method of establishing and maintaining a financial product as a life insurance product for an insured party comprising:
   electronically processing an initial funding premium for said life insurance financial product;
   electronically determining an initial cash surrender value for said life insurance financial product by accounting for said initial funding premium allocated in one or more investment accounts;
   electronically determining daily account values for said investment accounts and calculating a corresponding cash surrender value for said life insurance financial product;
   electronically determining a death benefit amount for said insured as a function of said corresponding cash surrender value sufficient to retain life insurance status for said life insurance financial product, said death benefit amount increasing and decreasing based upon said corresponding cash surrender value;
   electronically deducting a cost of an at-risk insurance amount corresponding to said death benefit amount from said corresponding cash surrender value sufficient to retain said life insurance status;
   minimizing said cost of said at-risk insurance amount in order to maximize said cash surrender value for said life insurance financial product;
   electronically funding said life insurance financial product with additional funding premiums and setting forth, in a schedule, said additional funding premiums, said schedule set forth in a policy established at the time said life insurance financial product is issued; and
   electronically processing said additional funding premiums set forth in said schedule without establishing insurability upon acceptance of said additional funding premiums such that each funding for said life insurance product acquires an amount of life insurance that varies with investment results over time.

16. A computerized method for a life insurance product as claimed in claim 15 wherein said cost of at risk insurance amount is a pro-rated portion of a monthly charge for the at risk amount and said cost of at risk insurance amount is deducted monthly.

17. A computerized method for a life insurance product as claimed in claim 15 including determining said initial cash surrender value after accounting for initial funding charges.

18. A computerized method for a life insurance product as claimed in claim 17 including accounting for initial funding charges, said initial funding charges being one or more charges from the group of charges including a premium sales charge, a premium federal tax charge, a premium state tax charge, and premium administrative charge.

19. A computerized method for a life insurance product as claimed in claim 18 wherein said funding charges are subtracted from said initial cash surrender value prior to determining account values and calculating said corresponding cash surrender value.

20. A computerized method for a life insurance product as claimed in claim 15 including investing the cash surrender value of the life insurance financial product in one or more financial investment accounts, including different investment funds, and calculating the cash surrender value the life insurance financial product as a function of gains and losses on said investment accounts.

21. A computerized method for a life insurance product as claimed in claim 15 wherein determining said death benefit amount is determining a life insurance base death benefit amount sufficient to retain said life insurance status which status correlated with retaining the tax status of life insurance under current law.

22. A computerized method for a life insurance product as claimed in claim 15 wherein said investment accounts provide earnings and including deducting, from said earnings, the cost of said at-risk insurance amount.

23. A computerized method for a life insurance product as claimed in claim 15 including re-allocating said corresponding cash surrender value into other financial investment funds or accounts and thereafter determining account values and the corresponding cash surrender value.

24. A computerized method for a life insurance product as claimed in claim 15 including determining said initial cash surrender value after accounting for initial funding charges.

25. A computerized method for a life insurance product as claimed in claim 24 including accounting for initial funding charges, said initial funding charges being one or more charges from the group of charges including a premium sales charge, a premium federal tax charge, a premium state tax charge, and premium administrative charge.

26. A computerized method for a life insurance product as claimed in claim 25 wherein said funding charges are subtracted from said initial cash surrender value prior to determining account values and calculating said corresponding cash surrender value.

27. A computerized method for a life insurance product as claimed in claim 26 including investing the cash surrender value of the life insurance financial product in one or more financial investment accounts, including different investment funds, and calculating the cash surrender value of the life insurance financial product as a function of gains and losses on said investment accounts and funds.

28. A computerized method for a life insurance product as claimed in claim 27 wherein determining said death benefit amount is determining a life insurance base death benefit amount sufficient to retain said life insurance status which status correlated with retaining the tax status of life insurance under current law.

29. A computerized method for a life insurance product as claimed in claim 28 wherein said investment accounts provide earnings and including deducting, from said earnings, the cost of said at-risk insurance amount.

30. A computerized method for a life insurance product as claimed in claim 29 including re-allocating said corresponding cash surrender value into other financial investment funds or accounts and thereafter determining account values and the corresponding cash surrender value.

31. A computerized method of establishing and maintaining a financial product as a life insurance product for an insured party comprising:
   electronically processing an funding initial funding premium for said life insurance financial product;
   electronically determining an initial cash surrender value for said life insurance financial product by accounting for said initial funding premium allocated in one or more investment accounts; upon fluctuation of said investment account or on a daily basis, determining account values for said investment accounts and calculating a corresponding cash surrender value for said life insurance financial product;
   electronically determining a death benefit amount for said insured as a function of said corresponding cash surrender value sufficient to retain life insurance status for said life insurance financial product, said death benefit amount increasing and decreasing based upon said corresponding cash surrender value;
   electronically deducting a cost of an at-risk insurance amount corresponding to said death benefit amount from said corresponding cash surrender value sufficient to retain said life insurance status;
   minimizing said cost of said at-risk insurance amount in order to maximize said cash surrender value for said life insurance financial product;
   funding said life insurance financial product with additional funding premiums and setting forth, in a schedule, said additional funding premiums, said schedule set forth in a policy established at the time said life insurance financial product is issued; and
   electronically processing said additional funding premiums set forth in said schedule without establishing insurability upon acceptance of said additional funding premiums such that each funding for said life insurance product acquires an amount of life insurance that varies with investment results over time.

32. A computerized method for a life insurance product as claimed in claim 31 wherein determining said death benefit amount involves determining a life insurance base death benefit amount for said insured as a function of said corresponding cash surrender value sufficient to retain life insurance status under a net single premium method based on age declining ratio to cash value amount for said life insurance financial product and age of the insured and his/her risk classification and smoking status, said life insurance base death benefit amount increasing and decreasing based upon said corresponding cash surrender value.

33. A computerized method for a life insurance product as claimed in claim 31 including calculating daily the deduction of said cost of said at-risk insurance amount; wherein said daily cost of at risk insurance amount is a pro-rated portion of a monthly charge for the at risk amount and said cost of at risk insurance amount is deducted monthly.

34. A computerized method for a life insurance product as claimed in claim 33 including determining said initial cash surrender value after accounting for initial funding charges.

35. A computerized method for a life insurance product as claimed in claim 34 including accounting for initial funding charges, said initial funding charges being one or more charges from the group of charges including a premium sales charge, a premium federal tax charge, a premium state tax charge, and premium administrative charge.

36. A computerized method for a life insurance product as claimed in claim 35 wherein said funding charges are subtracted from said initial cash surrender value prior to determining account values and calculating said corresponding cash surrender value.

37. A computerized method for a life insurance product as claimed in claim 31 including investing the cash surrender value of the life insurance financial product in one or more financial investment accounts, including different investment funds, and calculating the cash surrender accounts and funds.

38. A computerized method for a life insurance product as claimed in claim 31 wherein determining said death benefit amount is determining a life insurance base death benefit amount sufficient to retain said life insurance status which status correlated with retaining the tax status of life insurance under current law.

39. A computerized method for a life insurance product as claimed in claim 31 wherein said investment accounts provide earnings and including deducting, from said earnings, the cost of said at-risk insurance amount.

40. A computerized method for a life insurance product as claimed in claim 31 wherein minimizing said cost of said at-risk insurance amount in order to maximize said cash surrender value for said life insurance financial product includes calculating said cost of at risk insurance amount on a daily basis and deducting a pro-rated portion of a monthly charge for the at risk amount and said cost of at risk insurance amount is deducted monthly.

41. A computerized method for a life insurance product as claimed in claim 31 including re-allocating said corresponding cash surrender value into other financial investment funds or accounts and thereafter determining account values and the corresponding cash surrender value.

42. A computerized method of establishing and maintaining a financial product as a life insurance product for an insured party comprising:
   electronically processing an initial funding premium for said life insurance financial product with;
   electronically determining an initial cash surrender value for said life insurance financial product by accounting for said initial funding premium allocated in one or more investment accounts; minimizing life insurance costs by:
   electronically determining daily account values for said investment accounts and calculating a corresponding cash surrender value for said life insurance financial product;
   electronically determining daily a minimum amount of life insurance death benefit for said insured as a function of said corresponding cash surrender value, said minimum life insurance with death benefit being that minimum required to maintain said life insurance financial product as life insurance and said death benefit amount increasing and decreasing based upon said corresponding cash surrender value;
   electronically deducting a cost of an at-risk insurance amount corresponding to said death benefit amount from said corresponding cash surrender value sufficient to retain life insurance status for said life insurance financial product;

minimizing said cost of said at-risk insurance amount in order to maximize said cash surrender value for said life insurance financial product;

electronically funding said life insurance financial product with additional funding premiums and setting forth, in a schedule, said additional funding premiums, said schedule set forth in a policy established at the time said life insurance financial product is issued; and electronically processing said additional funding premiums set forth in said schedule without establishing insurability upon acceptance of said additional funding premiums such that each funding for said life insurance product acquires an amount of life insurance that varies with investment results over time.

43. A computerized method for a life insurance product as claimed in claim 42 wherein said minimum life insurance with death benefit being that minimum required to maintain said life insurance financial product as life insurance is based upon said daily cash surrender value and an age declining ratio to cash value amount for said life insurance financial product.

44. A computerized method for a life insurance product as claimed in claim 42 including deducting monthy said cost of said at-risk insurance amount.

45. A computerized method for a life insurance product as claimed in claim 42 including determining said initial cash surrender value after accounting for initial funding charges.

46. A computerized method for a life insurance product as claimed in claim 45 including accounting for initial funding charges, said initial funding charges being one or more charges from the group of charges including a premium sales charge, a premium federal tax charge, a premium state tax charge, and premium administrative charge.

47. A computerized method for a life insurance product as claimed in claim 46 wherein said funding charges are subtracted from said initial cash surrender value prior to determining account values and calculating said corresponding cash surrender value.

48. A computerized method for a life insurance product as claimed in claim 42 including investing the cash surrender of the life insurance financial product in one or more financial investment accounts, including different investment funds, and calculating the cash surrender value of the life insurance financial product as a function of gains and losses on said investment accounts and funds.

49. A computerized method for a life insurance product as claimed in claim 42 wherein determining said life insurance death benefit amount is determining a life insurance base death benefit amount sufficient to retain said life insurance status which status correlated with retaining the tax status of life insurance under current law.

50. A computerized method for a life insurance product as claimed in claim 42 wherein said investment accounts provide earnings and including deducting, from said earnings, the cost of said at-risk insurance amount.

51. A computerized method for a life insurance product as claimed in claim 42 including re-allocating said corresponding cash surrender value into other financial investment funds or accounts and thereafter determining account values and the corresponding cash surrender value.

* * * * *